(12) United States Patent
Fullana Font et al.

(10) Patent No.: US 12,435,200 B2
(45) Date of Patent: Oct. 7, 2025

(54) METHOD FOR DECONTAMINATING RECYCLED PLASTIC

(71) Applicant: Universidad de Alicante, San Vicente del Raspeig (ES)

(72) Inventors: Andrés Fullana Font, San Vicente del Raspeig (ES); Andrea Cabanes Gil, San Vicente del Raspeig (ES); Oksana Horodytska, San Vicente del Raspeig (ES)

(73) Assignee: UNIVERSIDAD DE ALICANTE, Alicante (ES)

( * ) Notice: Subject to any disclaimer, the term of this patent is extended or adjusted under 35 U.S.C. 154(b) by 700 days.

(21) Appl. No.: 17/757,325

(22) PCT Filed: Dec. 14, 2020

(86) PCT No.: PCT/ES2020/070785
§ 371 (c)(1),
(2) Date: Jun. 14, 2022

(87) PCT Pub. No.: WO2021/123475
PCT Pub. Date: Jun. 24, 2021

(65) Prior Publication Data
US 2023/0050476 A1 Feb. 16, 2023

(30) Foreign Application Priority Data

Dec. 20, 2019 (ES) .................. ES201931143

(51) Int. Cl.
*C08J 11/08* (2006.01)
*B29B 9/02* (2006.01)
*B29B 9/16* (2006.01)

(52) U.S. Cl.
CPC ............. *C08J 11/08* (2013.01); *B29B 9/02* (2013.01); *B29B 2009/168* (2013.01)

(58) Field of Classification Search
USPC .......................................................... 521/40
See application file for complete search history.

(56) References Cited

U.S. PATENT DOCUMENTS

| 5,368,796 A | * | 11/1994 | Lorenz ............... B29B 17/0412 241/3 |
| 5,629,352 A | | 5/1997 | Shiino et al. |
| 6,114,401 A | | 9/2000 | Doonan |
| 2008/0281002 A1 | | 11/2008 | Maeurer et al. |

FOREIGN PATENT DOCUMENTS

| CN | 103113615 A | 5/2013 | |
| WO | 2002038660 A1 | 5/2002 | |
| WO | WO-0238660 A1 * | 5/2002 | ............. C08J 11/08 |
| WO | WO-2004044042 A1 * | 5/2004 | ......... B29B 17/0052 |

OTHER PUBLICATIONS

WO-2004044042-A1 Machine Translation (Year: 2004).*
International Search Report mailed Mar. 10, 2021 issued in corresponding PCT Application No. PCT/ES2020/070785.
Search Report mailed Jul. 15, 2020 issued in corresponding Spanish Application No. P201931143.

* cited by examiner

*Primary Examiner* — Terressa Boykin
(74) *Attorney, Agent, or Firm* — ArentFox Schiff LLP

(57) ABSTRACT

The invention relates to a method for decontaminating recycled plastic materials, which comprises the steps of selecting, grinding, washing, rinsing, drying and decontaminating, wherein decontaminating is carried out by means of the steps of extracting and rinsing, and extracting is carried out using a water-soluble solvent having a boiling point greater than 180° C. at atmospheric pressure.

13 Claims, 1 Drawing Sheet

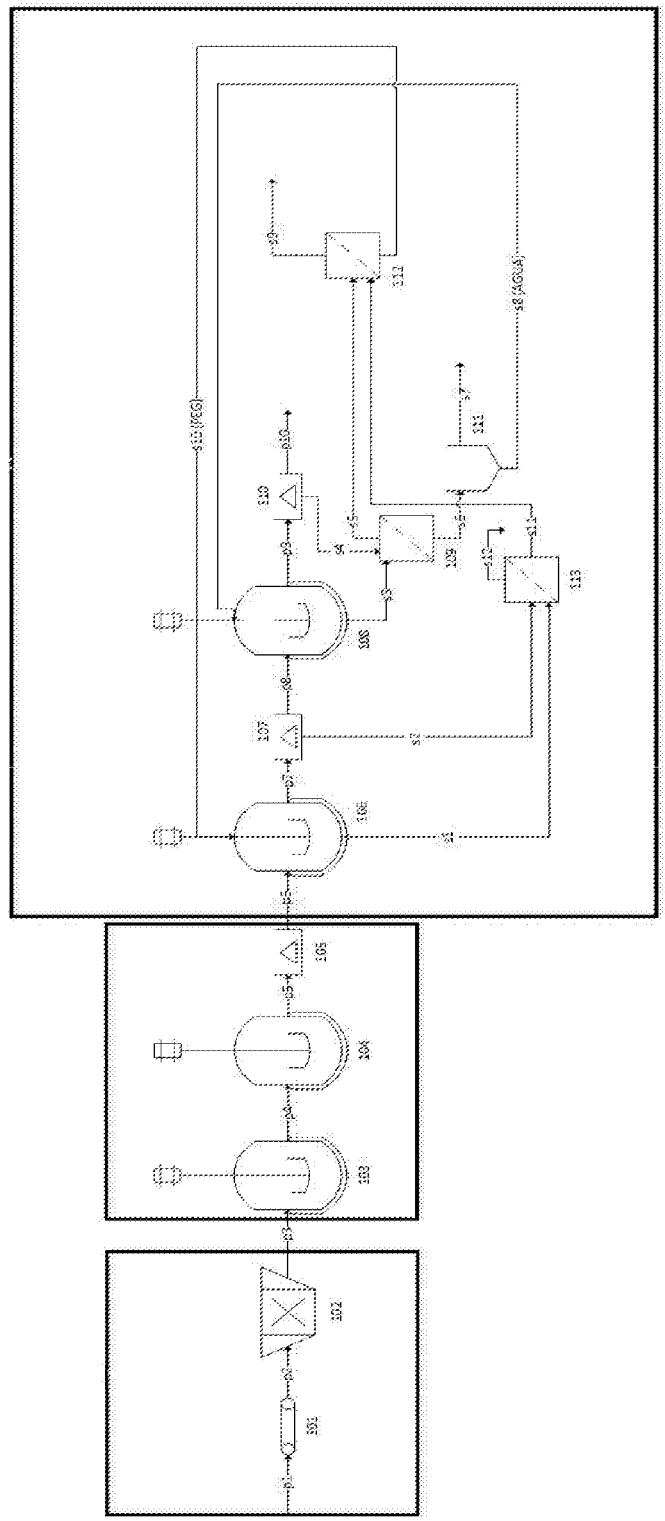

METHOD FOR DECONTAMINATING RECYCLED PLASTIC

CROSS-REFERENCE TO RELATED APPLICATIONS

This application is a 35 U.S.C. § 371 National Phase of PCT Application No. PCT/ES2020/070785, filed Dec. 14, 2020, which claims priority to Spanish Application No. P201931143, filed Dec. 20, 2019, the disclosures of each of which are incorporated herein by reference in their entirety.

FIELD OF THE INVENTION

The present invention relates to a novel method that enables plastics from domestic and industrial waste to be decontaminated. This process is intended to remove contaminants, and with them, the non-intentionally added substances (NIAS) found in the plastic matrix and surface dirt such as solid particles, adhesive residue or labels. This invention falls within the field of the processing of plastics of varied nature, such as polyethylene (PE), polypropylene (PP), polyester (PET), etc. from plastic waste, whether of industrial or domestic origin.

STATE OF THE ART

The demand for plastic packaging is increasing and with it the volume of plastic in landfills. While plastic waste from industries can be treated by means of mechanical recycling, obtaining a reusable high-quality material as polymeric raw material, domestic plastic waste has a high content of food remains and cleaning products that are absorbed into the polymeric matrix, becoming contaminants. Furthermore, waste classification technologies are not fully developed. As such, a high-grade plastic (for example, packaging) contains impurities from another less pure material in the manufacture of which additives were used that can pose a danger to the consumer (for example, bisphenol A, phthalates, etc.).

Conventional mechanical recycling that is performed consists of a selective classification of plastic waste based on the nature of the polymer, a wash with water, to which reagents such as soda, surfactants and oxidants can be added, and finally it goes through a mechanical drying step prior to the extrusion step where the recycled pellets are obtained. The contaminants that can be removed with the conventional method are mostly physical impurities such as soil, dust, organic surface remains, etc. However, in the case of chemical impurities within the plastic matrix and contaminants adhered to the plastic surface by the use of adhesives (e.g., paper labels), the technology is not developed.

Some patents related to the concept of the present invention can be found:

Recycled plastic washing device—WO2010147314 (A1): the invention relates to an equipment for washing and drying plastic waste. Contaminants are removed using water and centrifugation. In this case, the NIAS having a less polar nature cannot be removed due to the low water solubility thereof.

Method and apparatus for washing sheets of plastic material—CN109311188 (A): the invention relates to the washing of plastic sheets from industry or agriculture using water. The contaminants attached to the plastic are removed by intense stirring and subsequent sedimentation. In this case, the patent relates only to the removal of physical residues adhered to the surface, but not to the residues that have been diffused to the internal layers of the materials.

Waste plastic glue removal process system—CN108688021 (A): the invention relates to a system for removing glue present in plastic waste by means of friction with small particles in a washing bed, but other types of contaminants are not mentioned.

Method for reducing odours of olefinic polymer—JPS58196235 relates to a washing process wherein the polyolefins are washed with hot water containing dissolved oxygen for removing odours in the plastic. In this case, it relates to an oxidation method, which is not useful for all contaminants, since some contain organic molecules that are not easily oxidisable and that when oxidised give rise to other products and does not solve the NIAS problem.

Method for removing ink printed on plastic films—SI20130030764T: the invention relates to the removal of ink from the surface of plastics by means of washing with a solution of a water-based surfactant. In this case, only the inks are removed and it does not refer to other contaminants that may appear on the plastic due to previous use thereof.

Method for removing contaminants from plastic resin—US20060281895 (A1): the invention relates to a method for decontaminating polymeric resins wherein organic contaminants are extracted with volatile solvents, and the residual solvent that remains in the resin after extraction is removed with supercritical CO2. Although it covers the removal of non-water soluble substances, many solvent losses occur in this patent when working with a volatile solvent. Furthermore, when working with supercritical CO2, working at high pressures is required and therefore the system is complex.

Removal of odours in recycled plastic by steam entrainment—P201930501: the invention describes a system for removing odours in recycled plastic, through the removal of volatile organic compounds (VOCs) by means of steam entrainment. In this case, only the most volatile compounds are removed, but heavy contaminants may remain on the polymer surface due to the low volatility thereof.

Therefore, the patented processes in relation to the present invention do not cover the need to have a method for removing organic contaminants such as NIAS, covering both volatile and heavy components, but rather they cover the removal of only VOCs, oxidisable substances and water-soluble contaminants.

DESCRIPTION OF THE INVENTION

Due to the continuous increase in the use of plastic products, the generation of this waste has become a global problem in today's society, so that the recycling and subsequent use thereof as a raw material is required if plastic in landfills is to be reduced. At the same time, using plastic as a raw material enables production costs to be reduced in the industries of the sector, in addition to increasing the added value of the product, since awareness about caring for the environment and with it the demand for recycled products in the market is increasing.

The invention consists of a method for removing contaminants in recycled plastic materials by extracting the non-intentionally added substances (NIAS) from the plastic matrix using a water-soluble non-volatile solvent (having a boiling point greater than 180° C. at atmospheric pressure).

NIAS can be degradation products of the plastic itself, secondary products, adhesive residues, contaminants from previous phases of use, etc.

In a preferred embodiment, the solvent used can be selected from polyethylene glycol, polypropylene glycol or dimethylsulfoxide.

The present invention aims to improve the quality of recycled plastics after removing organic contaminants by extraction with non-volatile solvents at atmospheric pressure. These contaminants are found both inside the polymeric matrix and on the surface of the plastic. It has been proven that organic substances migrate from the plastic matrix towards the solvent, thus reducing the concentration thereof in the plastic.

The complete process for decontaminating plastic forms part of a mechanical recycling process, as the last treatment.

The method consists of several steps that are described below.

Step 1: Separation and grinding

The fraction of plastic material from landfill or from the domestic recycled plastic container reaches the plastic waste treatment plant and is separated by means of identification using NIR, MIR, IR thermography, LIBS, X-ray fluorescence, etc. Post-industrial plastic waste and commercial plastic waste are selectively collected at waste generation points.

The bags, films, bottles and other containers that arrive at the plant, after being separated by material type, are introduced into a bladed grinder to cut the containers into flake form, or in cases where it is required, a cryogenic mill or grinder that reduces the particles to powder size can be used.

Step 2: Washing, rinsing and drying

Washing with or without surfactant is performed to remove dirt that is attached to the surface from the plastic material. Both anionic and cationic or neutral surfactants can be used. The washing is performed in a stirred tank-type reactor. In the same way, other types of reagents such as oxidants can also be used to remove surface impurities.

After washing, the plastic material is rinsed to completely remove the dirt and chemicals used.

The drying step is performed after rinsing the plastic material to remove the moisture contained therein as much as possible. Drying is mechanically performed.

Step 3: Decontaminating

This step is carried out in the decontamination module, wherein contaminants such as NIAS are removed. Within the decontamination module, the following steps are carried out:
  3.1. Extracting with water-soluble solvent having a high boiling point, greater than 180° C. at atmospheric pressure.
  3.2. Rinsing the plastic at room temperature.

Before and after the rinsing step, a centrifugation treatment is applied to remove the solvent and dry the material, respectively.

Additionally, in the decontamination module, the water recovery and solvent recovery systems are to be found, so that they can be recirculated and reused, making the method more sustainable.

In a particular embodiment, the decontaminating system acts as a module that is entirely independent from the recycling process and its input is the recycled pellets, i.e., it is a system for improving the quality of the product already recycled by other companies.

To carry out the method a system or equipment is required which comprises:

means for selecting and grinding the material, among which a separation system and a bladed grinder stand out;
  washing means, among which a washing tank, a rinsing tank and a dryer stand out;
  and a decontamination module, which consists of a system for removing the NIAS contained in the plastic and recovering the same.

The decontamination module consists of a system for removing the organic contaminants contained in the plastic and recovering the same. Within this decontamination module there is an extractor in which the contaminants pass from the polymeric matrix to the solvent itself, working at high temperatures, but always below the degradation temperature of the treated plastic. After extraction, the plastic is introduced into a tank stirred with water to carry out the rinsing step, which removes the remains of solvent that have remained attached to the surface of the plastic. Before and after the rinsing step, the plastic is centrifuged: previously to remove as much solvent as possible before rinsing; and subsequently to dry the material.

When the rinsing water exceeds the established solvent concentration (according to the parameters that will be optimised for each process), the water stream passes to the water recovery system. An ultrafiltration membrane is used for water recovery wherein the solvent is separated from the water by difference in molecular size, obtaining on the one hand the water with the contaminants and on the other hand the solvent phase with possible solid particles that have remained in suspension. Another alternative is separation by crystallisation, wherein the solvent and the water are separated by the difference in melting points and the solvent remains in the solid state while the water remains in the liquid state. The contaminants found in the aqueous phase will be removed in a flocculation-decanting module. Clean water is recirculated to the rinsing step. The solvent stream that is obtained after ultrafiltration or crystallisation, free of contaminants, is introduced into a filter to separate the solid particles and the clean solvent is recirculated to the extraction system.

When the solvent used in the extraction step contains the limit concentration of contaminants (established for a certain process), it passes to the solvent recovery system. For solvent recovery, an ultrafiltration membrane can be used for separating the contaminants. Next, the solvent passes to a solids filter wherein the rest of the solid particles (labels, surface dirt, etc.) contained in the solvent phase are separated. Finally, the solvent that remains clean is recirculated to the extraction step.

Finally, it should be noted that, throughout the description and claims, the term "comprises" and its variants are not intended to exclude other technical features or additional elements.

BRIEF DESCRIPTION OF THE FIGURES

In order to complete the description and to make the features of the invention more readily understandable, a FIGURE is presented wherein the following is represented by way of illustration and not limitation:

FIG. 1 is a schematic diagram of the different elements of the method for carrying out the decontamination in recycled plastic materials. It shows the three modules of the method: the separation and grinding module, the washing, rinsing and drying module, and the decontamination module, with the pieces of equipment that make each step up and the inlet and outlet streams in each of them.

DETAILED DESCRIPTION OF AN EMBODIMENT

The method for removing contaminants in recycled plastic materials comprises the following steps:
1. Selecting and grinding The fraction of plastic material from landfill or from the domestic recycled plastic container (p1) is fed to the separation system (101). Once separated (p2), the bags, films, bottles and other containers that arrive at the plant are introduced into a bladed grinder (102) that reduces the particle size as much as required (p3).
2. Washing, Rinsing and Drying The shredded plastic stream (p3) enters the washing tank (103), and comes out through the stream p4, which is fed to the rinsing tank (104) to remove chemicals used in the wash and remaining dirt. Once the dirt and chemical substances have been removed, a clean material (p5) is obtained that must be mechanically dried in the dryer (105) before being decontaminated.
3. Decontaminating The stream of partially clean and dry plastic but still containing unwanted contaminants (p6) is fed to the decontamination module. The stream p6 enters the extractor (106) and after extracting the contaminants, it comes out through the stream p7. The extraction must be carried out with a water-soluble solvent having a high boiling point, greater than 180° C. at atmospheric pressure, and working at high temperatures (taking care not to reach the degradation temperature of the plastic itself). In a preferred embodiment, the solvent used was polyethylene glycol (PEG). The stream p7 passes through a centrifuge (107) in order to remove the largest proportion of solvent from the plastic and the already dry stream of solvent p8 passes to a water rinsing step in the second rinsing tank (108). The rinsed plastic comes out through the stream p9, which goes through another centrifugation step in the second centrifuge (110) in order to remove the moisture. The stream p10 comes out from this second centrifuge (110), where the completely decontaminated plastic is obtained.

The water recovery and solvent recovery systems are parallel to this plastic decontaminating system, so that they can be recirculated and reused, making the method more sustainable.

The water recovery system starts with the stream s3 coming out of the second rinsing tank (108) and the stream s4 coming out of the second centrifuge (110). The stream s3 contains mostly water along with residual solvent that remained in the plastic, and the stream s4 contains runoff from the plastic after centrifugation at (110) which mostly consists of water and residual solvent. The streams s3 and s4 enter the ultrafiltration membrane (109) which separates the solvent from the water and the contaminants. After separation in the ultrafiltration membrane (109), the solvent is separated into the stream s5 on the one hand and the water with the contaminants in s6 on the other hand. The water is separated from the contaminants in the flocculation-decanting module (111) obtaining a recirculation water in the current s8 that is introduced again in the decontamination module in the second rinsing tank (108). The flocculation-decanting module (111) also comes out of the stream s7, which contains the contaminants.

The solvent recovery system starts with the currents s1 and s2, composed of the solvent and the contaminants that have been extracted from the extractor (106) and the centrifuge (107). The streams s1 and s2 are introduced into a second ultrafiltration membrane (113) such that contaminants are removed through the stream s12 and the solvent comes out through s11. Finally, stream s11, together with stream s5 that comes from water recovery, may contain solids in suspension and must pass through a filter (112), from which the stream s9 with the retained solids and the stream s10, which is the clean solvent that is recirculated to the extractor (106) come out.

In a preferred embodiment, the decontaminating system acts as a module that is entirely independent from the recycling process and its input is the recycled pellets, i.e., it is a system for improving the quality of the product already recycled by other companies.

The invention claimed is:

1. A method for decontaminating recycled plastic comprising the following steps:
    separating the recycled plastic by type of material;
    grinding the separated plastic to reduce a size of the material to flake or powder;
    washing, rinsing and drying the material;
    decontaminating the material;
    wherein decontaminating the material comprises:
        extracting contaminants from the material with a water-soluble solvent having a boiling point greater than 180° C.; and
        rinsing the decontaminated material with water at room temperature;
    separating the solvent from the water; and
    decontaminating the separated solvent and the separated water in a continuous process to enable recirculation and reuse of the separated solvent and the separated water; and
    wherein the step of decontaminating the material is carried out independently from a recycling process such that the recycled plastic can be plastic recycled by other methods.

2. The method for decontaminating recycled plastic according to claim 1, wherein the separation step is carried out by means of an identification technique selected from NIR, MIR, infrared thermography, LIBS or X-ray fluorescence.

3. The method for decontaminating recycled plastic according to claim 1, wherein the grinding step is carried out by means of a bladed grinder, or a cryogenic mill or grinder.

4. The method for decontaminating recycled plastic according to claim 1, wherein the washing step is performed with an anionic, cationic or neutral surfactant.

5. The method for decontaminating recycled plastic according to claim 1, wherein, in the washing step, oxidising agents are used to remove surface impurities.

6. The method for decontaminating recycled plastic according to claim 1, wherein the drying step is mechanically performed.

7. The method for decontaminating recycled plastic according to claim 1, wherein the solvent is polyethylene glycol.

8. The method for decontaminating recycled plastic according to claim 1, wherein the solvent is polypropylene glycol.

9. The method for decontaminating recycled plastic according to claim 1, wherein the solvent is dimethylsulfoxide.

10. The method for decontaminating recycled plastic according to claim 1, wherein a centrifugation step is carried out before the rinsing step to remove solvent and after the rinsing step to dry the material.

11. The method for decontaminating recycled plastic according to claim 1, wherein separating the solvent from the water is carried out by means of ultrafiltration or crystallization.

12. The method for decontaminating recycled plastic according to claim 1, wherein decontaminating the separated water is carried out by means of flocculation-decanting.

13. The method for decontaminating recycled plastic according to claim 1, wherein decontaminating the separated solvent is carried out by means of an ultrafiltration membrane and subsequent filtering.

* * * * *